(12) United States Patent
Fontvieille et al.

(10) Patent No.: US 9,944,290 B2
(45) Date of Patent: Apr. 17, 2018

(54) METHOD AND SYSTEM FOR CONTROLLING THE REGENERATIVE BRAKING OF AN ELECTRIC OR HYBRID MOTOR VEHICLE

(71) Applicant: RENAULT s.a.s., Boulogne-Billancourt (FR)

(72) Inventors: Laurent Fontvieille, Gif Sur Yvette (FR); Emmanuel Buis, Verrieres Le Buisson (FR); Benoit Verbeke, Les Essarts Le Roi (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/034,315

(22) PCT Filed: Nov. 5, 2014

(86) PCT No.: PCT/FR2014/052812
§ 371 (c)(1),
(2) Date: May 4, 2016

(87) PCT Pub. No.: WO2015/067889
PCT Pub. Date: May 14, 2015

(65) Prior Publication Data
US 2016/0264144 A1    Sep. 15, 2016

(30) Foreign Application Priority Data
Nov. 5, 2013  (FR) ...................................... 13 60823

(51) Int. Cl.
*B60W 20/00*     (2016.01)
*B60K 6/48*      (2007.10)
(Continued)

(52) U.S. Cl.
CPC ...... *B60W 30/18127* (2013.01); *B60W 20/00* (2013.01); *B60W 30/18072* (2013.01);
(Continued)

(58) Field of Classification Search
CPC ......... B60W 20/00; B60K 6/48; B60K 6/485; B60K 6/543; B60K 6/448; B60L 15/20;
(Continued)

(56) References Cited

U.S. PATENT DOCUMENTS 5,915,801 A * 6/1999 Taga ........................ B60K 6/48
303/152
5,967,621 A * 10/1999 Ito ............................ B60T 8/00
303/15

(Continued)

FOREIGN PATENT DOCUMENTS

| DE | 10 2009 039 614 A1 | 3/2011 |
|---|---|---|
| DE | 10 2010 054 913 A1 | 8/2011 |
| EP | 0 754 588 A1 | 1/1997 |
| WO | WO 2012/105896 A1 | 8/2012 |

OTHER PUBLICATIONS

International Search Report dated Mar. 4, 2015, in PCT/FR2014/052812 filed Nov. 5, 2014.

(Continued)

*Primary Examiner* — Yuri Kan
(74) *Attorney, Agent, or Firm* — Oblon, McClelland, Maier & Neustadt, L.L.P.

(57) ABSTRACT

A method controls regenerative braking of a motor vehicle provided with an electric or hybrid powertrain. The method includes determining that a driver is pressing neither a throttle pedal nor a brake pedal of the vehicle. The method also includes determining a correction coefficient as a function of a torque supplied by a motor of the powertrain, of a speed and an angular velocity at a wheel of the vehicle, of a gradient, of a mass of the vehicle, and of friction. Next, the (Continued)

method includes determining a setpoint for regenerative braking without pressure on the brake pedal as a function of the correction coefficient and of two maps of torque as a function of a rotational speed of the powertrain, for a substantially zero gradient and a vehicle mass substantially equal to a reference mass of the vehicle.

9 Claims, 1 Drawing Sheet

(51) Int. Cl.
*B60L 15/20* (2006.01)
*B60T 8/172* (2006.01)
*B60W 30/18* (2012.01)
*B60W 50/00* (2006.01)

(52) U.S. Cl.
CPC . *B60W 2050/0026* (2013.01); *B60W 2520/10* (2013.01); *B60W 2520/28* (2013.01); *B60W 2530/10* (2013.01); *B60W 2550/142* (2013.01); *B60W 2550/148* (2013.01)

(58) Field of Classification Search
CPC ........ B60L 7/14; B60L 15/2009; B60T 8/172; B60T 8/00
See application file for complete search history.

(56) References Cited

U.S. PATENT DOCUMENTS

| 6,098,733 | A | * | 8/2000 | Ibaraki | B60K 6/543 180/65.28 |
| 6,321,144 | B1 | * | 11/2001 | Crombez | B60L 15/2009 303/152 |
| 6,364,434 | B1 | * | 4/2002 | Sway-Tin | B60L 15/20 303/152 |
| 6,634,447 | B1 | * | 10/2003 | Matsubara | B60K 6/485 180/65.26 |
| 2002/0041167 | A1 | * | 4/2002 | Kitano | B60K 6/48 318/3 |
| 2005/0012501 | A1 | * | 1/2005 | Isono | B60T 8/172 324/300 |
| 2013/0332015 | A1 | * | 12/2013 | Dextreit | B60K 6/448 701/22 |
| 2016/0152143 | A1 | * | 6/2016 | Nakamura | B60L 7/14 701/22 |

OTHER PUBLICATIONS

French Search Report dated May 19, 2014, in French Application 1360823 filed Nov. 5, 2013.

* cited by examiner

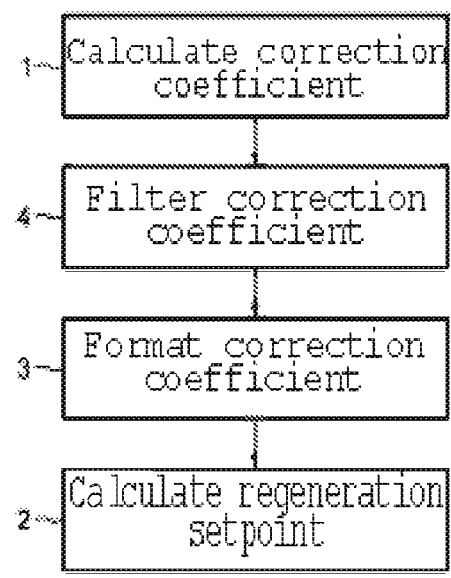
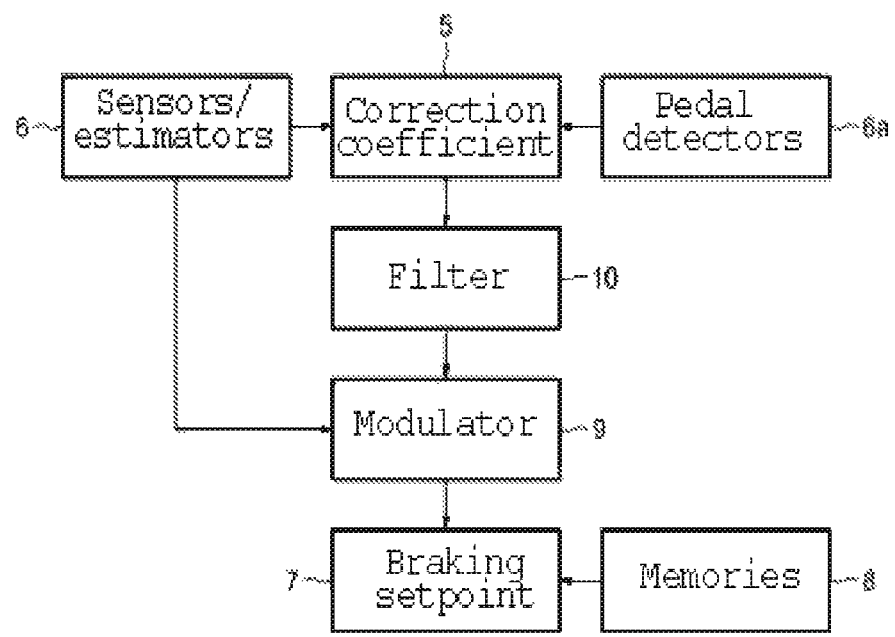

METHOD AND SYSTEM FOR CONTROLLING THE REGENERATIVE BRAKING OF AN ELECTRIC OR HYBRID MOTOR VEHICLE

The technical field of the invention is the control of electric powertrains of electric or hybrid vehicles.

Motor control is the technique of managing an electric motor with all of its sensors, and the control software and electronics. All of the command and control laws (software strategies) and parameters (calibrations) that characterize a motor are contained in a computer referred to as an ECU (electronic control unit).

In an electric or hybrid vehicle, electric motor control makes it possible to interpret the desire of the driver (throttle and brake pedals) as positive or negative torque setpoints. This (positive or negative) setpoint for the torque supplied by the motor is then transmitted to the power electronics (inverter, chopper, etc.) which formulates the corresponding magnitudes for electric setpoints (voltage and current). The electric motor converts the electric power into mechanical power which is transmitted to the wheels in the form of torque, possibly via a reduction gearbox.

This collection of electromechanical components transmits the driver setpoint torque to the wheels and is referred to as the drivetrain.

The presence of an electric machine in a motor vehicle means that the reversible nature of its operation can be put to good use. It is possible, during braking phases, to convert the mechanical power into electrical power that can be stored in the battery. This braking, referred to as regenerative braking, makes it possible to increase the autonomy of the vehicle and reduce the fuel consumption in the case of a hybrid vehicle.

In the prior art, the operating zone for an electric machine of an electric vehicle is delimited by two curves, a curve of maximum torque in motor mode and a curve of minimum torque in generator mode.

The curve of maximum torque in motor mode is defined by the maximum performance of the drivetrain with a zone of constant torque (low-speed zone) and a zone of constant power (high-speed zone).

The curve of minimum torque in generator mode is likewise partly defined by the performance of the drivetrain but is also modulated according to the position of the brake pedal. Specifically, with no pressure applied on the brake pedal, the minimum torque setpoint makes it possible to simulate engine braking. When pressure is applied to the brake pedal, the torque setpoint is interpolated between the foot-off torque setpoint and the curve of minimum torque in generator mode. The greater the pressure applied to the brake pedal, the more the torque setpoint tends toward the minimum torque in generator mode.

The curve of minimum torque with no pressure on the brakes is designed to conform to a level of deceleration when the vehicle has a mass close to the reference mass, and is subjected to a substantially zero gradient, and to reference friction forces. As a result, in a descent when the driver is applying pressure neither to the throttle nor to the brake, the regenerative braking is limited by the curve of minimum torque without pressure on the brakes, and the effect of this is:
   either to limit the autonomy of the vehicle with excessive acceleration of the vehicle,
   or to place demands on the driver in terms of action on the brake pedal.

Conversely, in an ascent when the driver is applying pressure neither to the throttle nor to the brake, there is a risk that the regenerative braking may be excessive, the effect of this being:
   either to produce excessive deceleration,
   or to place demands on the driver in terms of action on the throttle pedal.

By analogy, an increase in the mass of the vehicle or a decrease in the friction may be likened to a descent. Conversely, a reduction in the mass of the vehicle or an increase in the friction may be likened to an ascent.

Document JP 3441552 discloses a method for controlling the regenerative braking of an electric vehicle based on control of the speed so as to limit the use of the mechanical brake in a descent and thereby limit the wear thereof. However, it takes only the gradient into consideration.

Thus, in the documents of the prior art, it may be seen that the level of regenerative braking is defined to conform to a level of deceleration only with substantially zero gradient, and that this conformity is lost:
   in ascents and descents,
   upon variations in the mass of the vehicle (e.g. number of occupants, towing, etc.),
   in variations in the friction applied to the vehicle (e.g. tire wear, condition of the road surface, etc.).

It would also seem, from certain documents, that the level of regenerative braking is corrected via a calculation loop which adds or removes a torque increment according to the level of acceleration. This correction is slow because a discrepancy in the acceleration needs to be observed in order for the calculation loop to be able to converge toward the correct value for regenerative braking.

As a result, there is a risk that this correction may cause fluctuations in torque if the increment is too high and of generating variations in acceleration if the increment is too slow on uneven gradients.

There is therefore a need for a control method and system capable of taking into consideration the gradient, the mass of the vehicle and any friction exerted on the vehicle when determining the setpoint for braking without pressure on the brake pedal.

One subject of the invention is a method for controlling the regenerative braking of a motor vehicle provided with an electric or hybrid powertrain. The method comprises the following steps:
   determining that the driver is pressing neither the throttle pedal nor the brake pedal,
   determining a correction coefficient as a function of the torque supplied by the motor, of the speed of the vehicle and of the angular velocity at the wheel, of the gradient, of the mass of the vehicle and of friction, and
   next determining a setpoint for regenerative braking without pressure on the brake pedal as a function of the correction coefficient and of two maps of torque as a function of the rotational speed of the powertrain, for a substantially zero gradient and a vehicle mass substantially equal to a reference mass of the vehicle.

The method may comprise a modulation step between the step of determining the correction coefficient and the step of determining the braking setpoint, during which the correction coefficient is modulated as a function of at least one value derived from the running conditions and from the characteristics of the vehicle, notably the gradient, the mass of the vehicle or the friction applied to the vehicle.

The method may comprise a step of filtering the correlation coefficient.

Another subject of the invention is a system for controlling the regenerative braking of a motor vehicle equipped with an electric or hybrid powertrain. The system comprises a determining means of determining the correction coefficient connected at input to a set of sensors and/or of means of estimating the running conditions and characteristics of the vehicle and to a determining means able to determine that the throttle pedal and the brake pedal are not depressed, and a determining means for determining the braking setpoint connected at input to the determining means that determine the correction coefficient and to memories containing two maps of regenerative braking setpoints as a function of the rotational speed of the powertrain, for a substantially zero gradient and a vehicle mass substantially equal to a reference mass of the vehicle.

The system may comprise a modulating means connected between the determining means that determines the correction coefficient and the determining means that determines the braking setpoint, so as to modulate the correction coefficient as a function of at least one value derived from the running conditions and from the characteristics of the vehicle, notably the gradient, the mass of the vehicle or friction applied to the vehicle.

The system may comprise a filtering means positioned at output of the determining means that determines the correction coefficient, so as to limit the amplitude of the variations in the correction coefficient.

The invention thus proposes a novel principle for determining the regenerative braking without pressure on the brake pedal that takes into consideration the (ascending or descending) gradient in which the vehicle finds itself.

The invention therefore offers the advantage of no longer having a response time because the setpoint corrections are dependent solely on the variations in gradient, mass and friction.

In addition, the invention also offers the advantage of generating neither fluctuations in torque nor variations in acceleration.

It also has the advantage of being able to adapt to the variations in mass, gradient and friction (wind etc.) even in situations in which the vehicle is decelerating.

Further objects, features and advantages of the invention will become apparent from reading the following description, given solely by way of non limiting example and made with reference to the attached drawing in which:

FIG. 1 illustrates the method for controlling the regenerative braking of an electric or hybrid motor vehicle, and FIG. 2 illustrates the system for controlling the regenerative braking of an electric or hybrid vehicle.

The control method overall comprises a step during which the influences of variations in gradient, in mass or in friction with respect to a vehicle running on substantially flat ground are determined in succession. Next, a correction factor is determined that reflects the variations experienced by the vehicle. The method then comprises a second step during which the regenerative braking setpoint is determined as a function of the correction factor.

In order to determine the influence of variations in gradient, in mass or in friction, a balance of forces acting on the vehicle is calculated by applying the fundamental principle of dynamics. This then gives the following equation:

$$\Sigma F = M \cdot \gamma \quad \text{(Eq. 1)}$$

where $\Sigma F$: is the sum of the forces applied to the vehicle,
$M$: is the mass of the vehicle, and
$\gamma$: is the acceleration of the vehicle.

For a vehicle running on substantially flat ground, which means to say ground without gradient, equation Eq. 1 can be rewritten accordingly.

$$\Sigma F = F_{Friction} + F_{drive} = M \cdot \gamma \quad \text{(Eq. 2)}$$

where
$F_{Friction}$: is the friction forces
$F_{drive}$: is the drive force generated by the vehicle In the case of a variation in gradient, in mass or in friction, a corrective term $F_{Cor}$ consistent with a force is introduced. Equation Eq. 2 is then rewritten as follows:

$$\Sigma F = F_{Cor} + F_{Friction} + F_{drive} = M \cdot \gamma \quad \text{(Eq. 3)}$$

The following expression for the corrective term $F_{Cor}$ can therefore be extracted from equation Eq. 3 as follows:

$$F_{Cor} = M \cdot \gamma - F_{Friction} - F_{drive} \quad \text{(Eq. 4)}$$

Expressing and developing equation Eq. 4 at the point of contact of the wheels with the ground yields the following equation:

$$F_{cor} = F_{wheel} - F_{friction} - F_{inertia} \quad \text{(Eq. 5)}$$

where:
$F_{cor}$=corrective force applied to the wheel as a function of the variation in the angle of the gradient $\alpha_{grad}$, in the mass and in the friction of the vehicle,
$F_{wheel}$=driving force at the wheel, and
$F_{friction}$=reference force caused by resistive friction loadings, notably aerodynamic loadings and tire friction.
$F_{inertia}$=force due to the inertia of the moving parts of the vehicle, notably powertrain, reduction gearbox and wheels.

The term $F_{cor}$ can be expressed as follows:

$$F_{Cor} = M_{vh} \cdot g \cdot \sin(\alpha\text{grad}) \quad \text{(Eq. 6)}$$

where
$M_{vh}$=reference mass of the vehicle,
$g$=acceleration due to gravity,
$\alpha_{grad}$=angle of the gradient.

The term $F_{wheel}$ can be expressed as follows:

$$F_{wheel} = \frac{C_{pplant}}{r_{reduction} \cdot R_{wheel}} \quad \text{(Eq. 7)}$$

where
$C_{pplant}$=torque supplied by the motor,
$r_{reduction}$=reduction ratio between the powertrain and the wheel,
$R_{wheel}$=radius of the wheel.

The term $F_{friction}$ can be expressed as follows:

$$F_{friction} = (\tfrac{1}{2} \cdot \rho_{air(P,T)} \cdot SC_x \cdot V_{vh}^2 + K \cdot M_{vh}) \quad \text{(Eq. 8)}$$

where
$\rho_{air}(P,T)$=density of the air as a function of pressure and temperature,
$SCx$=product of the frontal area of the vehicle times the reference coefficient of drag,
$V_{vh}$=vehicle speed,
$K$=reference tire coefficient of friction.

The term $F_{inertia}$ can be expressed as follows:

$$F_{inertia} = \left[ M_{vh} + \frac{J_{pplant}}{r_{reduction}^2 \cdot R_{wheel}^2} + \frac{4 \cdot J_{wheel} + J_{reduction}}{R_{wheel}^2} \right]. \quad \text{(Eq. 9)}$$

$$R_{wheel} \dot{\omega}_{wheel}$$

where $J_{pplant}$=inertia of the powertrain, $J_{wheel}$=inertia of the wheel, $J_{reduction}$=inertia of the reduction system between the powertrain and the wheel (=reduction gear or gearbox), $\dot{\omega}_{wheel}$=derivative of the velocity of the wheel.

It may thus be seen that the term $F_{cor}$ varies in proportion with the gradient of the road expressed as a percent, with the mass and with friction, when considering a first order development of the sine function.

Knowing the force supplied by the powertrain $F_{pplant}$ and the rotational speed of the wheels $\omega_{wheel}$, two terms are enough to define the correction force $F_{cor}$. These terms are the friction force $F_{friction}$ and the inertia force $F_{inertia}$.

Using equations 5 to 9 it is then possible to define a correction coefficient $Coeff_{cor}$ by normalizing the term $F_{cor}$ so that it varies between −1 and +1. The correction coefficient $Coeff_{cor}$ is then expressed as follows:

$$Coeff_{cor} = A \cdot C_{pplant} - B \cdot V_{vh} - C \cdot \dot{\omega}_{wheel} \quad \text{(Eq. 10)}$$

where:

A: a coefficient dependent only on the gearbox ratios and the diameter of the wheels, B and C are coefficients grouped together in calibration tables, $Coeff_{cor}$: the estimated correction coefficient in %, varying from −100% for a descent, an increase in mass of the vehicle or a decrease in friction to +100% for an ascent, a reduction in the mass of the vehicle or an increase in friction.

FIG. 1 illustrates the method for controlling the regenerative braking of an electric or hybrid motor vehicle. During a first step 1 of the control method, the correction coefficient is determined. It is also determined that the brake and throttle pedals are not being depressed by the driver.

During a second step 2, the setpoint for regenerative braking with no pressure on the brake pedal is then calculated by linear interpolation of two setpoint curves of regenerative braking as a function of the correction coefficient. The setpoint curves provide a value for the braking torque as a function of the rotational speed of the powertrain for a substantially zero gradient and a vehicle mass substantially equal to a reference mass.

The first curve defines the maximum value for the regenerative braking without pressure on the brake pedal over an increase in the correction coefficient $Coeff_{cor}$.

The second curve defines the maximum value for the regenerative braking without pressure on the brake pedal over a reduction in the correction coefficient.

The two curves are defined as a calibration as a function of the desired feel of motor braking.

The regenerative braking setpoint $C_{br\_sp}$ is therefore calculated as a function of the correction coefficient $Coeff_{cor}$ determined by application of equation Eq. 10 as follows:

$$C_{br\_sp} = \frac{\left[ C_{br\_a\_sp} \cdot \left( \frac{Coeff_{cor}}{100} + 1 \right) + C_{br\_d\_sp} \cdot \left( 1 - \frac{Coeff_{cor}}{100} \right) \right]}{2} \quad \text{(Eq. 11)}$$

where:

$C_{br\_a\_sp}$=setpoint for regenerative braking without pressure on the brake pedal in an ascent, $C_{br\_d\_sp}$=setpoint for regenerative braking without pressure on the brake pedal in a descent.

This calculation makes it possible to have available a variation in the regenerative braking as a function of the variations in gradient, in mass and in friction.

It must be noted that it is possible to determine a reformatted value of the correction coefficient by considering a weighting factor for weighting the correction coefficient $Coeff_{cor}$ that is non-linearly dependent on the gradient experienced by the vehicle.

The reformatted value of the correlation coefficient is then substituted for the value of the correction coefficient $Coeff_{cor}$ in equation 11. A step 3 may then be interposed between steps 1 and 2 of the control method.

Moreover, the correction coefficient may also be filtered in order to limit excessively abrupt variations in engine braking associated with the excessively strong variations in gradient, in mass and in friction. A step 4 may therefore be interposed between steps 1 and 2 of the control method, possibly in combination with step 3.

FIG. 2 illustrates a system for controlling the regenerative braking of an electric or hybrid vehicle. The system comprises a means 5 of determining the correction coefficient which is connected to a set 6 of sensors or of means for estimating the running conditions and the characteristics of the vehicle, such as the mass. The determining means 5 is also connected at input to a determining means 6a able to determine that the throttle pedal and the brake pedal have not been depressed.

The determining means 5 for determining the correction coefficient applies equation Eq. 10 in order to determine a correction coefficient.

The system also comprises a determining means 7 for determining the braking setpoint which is connected at input to the determining means 5 that determines the correction coefficient and to memories 8 containing two maps of regenerative braking setpoints as a function of the rotational speed of the powertrain.

The determining means 7 determines the regenerative braking setpoint as a function of the correction coefficient and of the maps by applying equation Eq. 11.

A modulating means 9 may be connected between the determining means 5 that determines the correction coefficient and the determining means 7 that determines the braking setpoint so as to modulate the correction coefficient as a function of at least one value derived from the running conditions and the characteristics of the vehicle.

A filtering means 10 may also be positioned at output of the determining means 5 that determines the correction coefficient so as to limit the amplitude of the variations in correction coefficient. The filtering means 10 may be associated with the modulating means 9 or be used exclusively.

As shown in FIG. 2, the determining means 5 may be connected to the set of sensors 6 and the pedal detectors 6a. The determining means 5 may also be connected to the filtering means 10, and the filtering means 10 may be connected to the modulating means 9. Further, the set of sensors 6 may be connected to the modulating means 9. The modulating means 9 may also be connected to the determining means 7, which is connected to the memories 8.

The invention claimed is:

1. A method for controlling a regenerative braking of a motor vehicle provided with an electric or hybrid powertrain, comprising:

determining that a driver is pressing neither a throttle pedal nor a brake pedal of the vehicle;

determining a correction coefficient as a function of a torque supplied by a motor of the powertrain, of a speed of the vehicle and an angular velocity of a wheel of the vehicle, of a gradient, of a mass of the vehicle, and of friction; and then determining a setpoint for the regenerative braking without pressure on the brake pedal as a function of the correction coefficient and of two maps of torque as a function of a rotational speed of the wheels as a product of force supplied by the powertrain, for a substantially zero gradient and a vehicle mass substantially equal to a reference mass of the vehicle.

2. The method as claimed in claim 1, further comprising:
modulating, between the determining the correction coefficient and the determining the braking setpoint, the correction coefficient as a function of at least one value derived from running conditions and from characteristics of the vehicle, including the gradient, the mass of the vehicle, or the friction applied to the vehicle.

3. The method as claimed in claim 1, further comprising:
filtering the correlation coefficient.

4. A system for controlling a regenerative braking of a motor vehicle equipped with an electric or hybrid powertrain, comprising:
a computer configured to
determine a correction coefficient based on a first input from a set of sensors that estimate running conditions and characteristics of the vehicle, and a second input from pedal detectors that a throttle pedal and a brake pedal of the vehicle are not depressed, and
determine a braking setpoint using two maps of the regenerative braking setpoints as a function of a rotational speed of wheels as a product of force supplied by the powertrain, for a substantially zero gradient and a vehicle mass substantially equal to a reference mass of the vehicle.

5. The system as claimed in claim 4, wherein the computer is further configured
to modulate the correction coefficient as a function of at least one value derived from the running conditions and from the characteristics of the vehicle, including a gradient, the mass of the vehicle, or friction applied to the vehicle.

6. The system as claimed in claim 4, wherein the computer is further configured
to limit an amplitude of variations in the correction coefficient.

7. A system for controlling a regenerative braking of a motor vehicle equipped with an electric or hybrid powertrain, said system comprising:
an electronic control unit (ECU) programmed to
determine a correction coefficient based on a first input from a set of sensors that estimate running conditions and characteristics of the vehicle, and a second input from pedal detectors that a throttle pedal and a brake pedal of the vehicle are not depressed, and
determine a braking setpoint using two maps of the regenerative braking setpoints as a function of a rotational speed of wheels as a product of force supplied by the powertrain, for a substantially zero gradient and a vehicle mass substantially equal to a reference mass of the vehicle.

8. The system as claimed in claim 7, wherein the ECU is further programmed to modulate the correction coefficient as a function of at least one value derived from the running conditions and from the characteristics of the vehicle, including a gradient, the mass of the vehicle, or friction applied to the vehicle.

9. The system as claimed in claim 7, wherein the ECU is further programmed to limit an amplitude of variations in the correction coefficient.

* * * * *